United States Patent [19]
Przybylski, Sr.

[11] Patent Number: 4,622,873
[45] Date of Patent: Nov. 18, 1986

[54] SEMI-AUTOMATIC VALVE TOOL

[75] Inventor: Stanley P. Przybylski, Sr., Lanoka Harbor, N.J.

[73] Assignee: PPT, Inc., Forked River, N.J.

[21] Appl. No.: 746,189

[22] Filed: Jun. 18, 1985

[51] Int. Cl.⁴ .............................................. B23B 5/06
[52] U.S. Cl. ................................... 82/4 R; 408/135; 408/709
[58] Field of Search ............ 82/4 R, 4 C; 51/241 VS, 51/241 A; 408/135, 709

[56] References Cited

U.S. PATENT DOCUMENTS

| | | | |
|---|---|---|---|
| 2,094,225 | 9/1937 | Tuttle | 82/4 R |
| 2,211,134 | 8/1940 | Kruell | 82/4 R |
| 2,283,323 | 5/1942 | Erhardt | 82/4 R |
| 3,379,080 | 4/1968 | Massa | 82/4 R |
| 3,412,813 | 11/1968 | Johnson | 408/135 |
| 3,772,944 | 11/1973 | Becker et al. | 82/4 R |
| 4,463,633 | 8/1984 | Grimsley | 82/4 R |

FOREIGN PATENT DOCUMENTS 81180   6/1983   European Pat. Off. ............. 82/4 R Primary Examiner—Francis S. Husar
Assistant Examiner—Jerry Kearns
Attorney, Agent, or Firm—Harvey B. Jacobson

[57] ABSTRACT

An apparatus for performing various machining operations on the interior surface areas of a large steam valve or the like which includes a value seat ring with a valve seat thereon secured to a valve seat ring step interiorly of the valve body. The apparatus includes a support plate fixedly secured to the open end of the valve body, a drive tube rotatably and axially supported from the support plate, a spider assembly mounted on the inner end of the drive tube and including radially expandable and retractable jaws or centering members for engaging the interior of the valve body to stabilize and support the rotatable drive tube and orient the drive tube concentric with the valve seat or other interior surface areas to be machined. Axial movement of the drive tube is obtained by a lockable rack gear and pinion gear assembly while rotation of the drive tube is accomplished by a worm gear drive arrangement mounted on the support plate and engaged with a bushing connected to the drive tube. The inner end of the drive tube includes a tool assembly including a cross-slide feed, a slide and tool adapter with the slide feed being finely adjustable from the outer end of the drive tube and the axial position of the tool adapter and tool also being finely adjusted from externally of the drive tube at the outer end thereof thereby providing both a rough axial adjustment, a fine axial adjustment and a fine lateral or radial adjustment of the tool adapter and tool so that the tool can be moved in a circular path having a center coincident with the center of the valve body.

7 Claims, 14 Drawing Figures

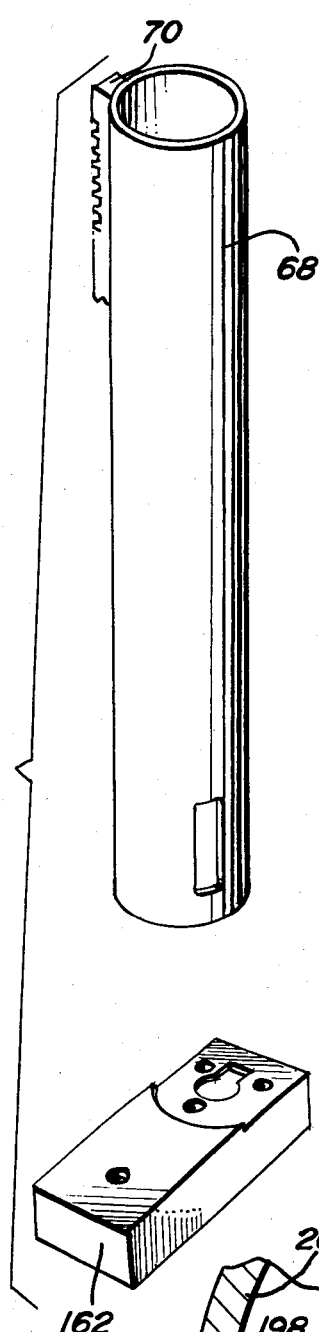
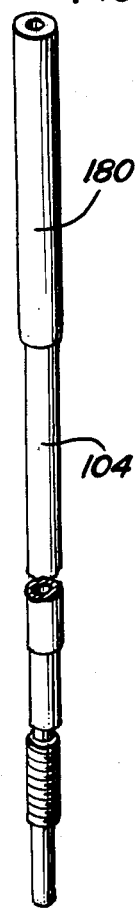
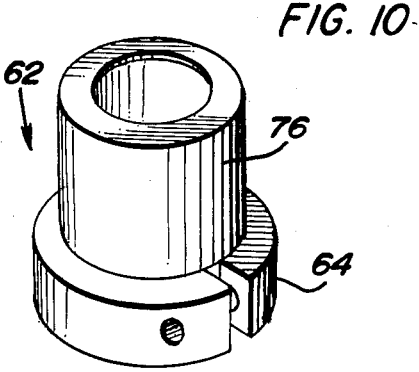
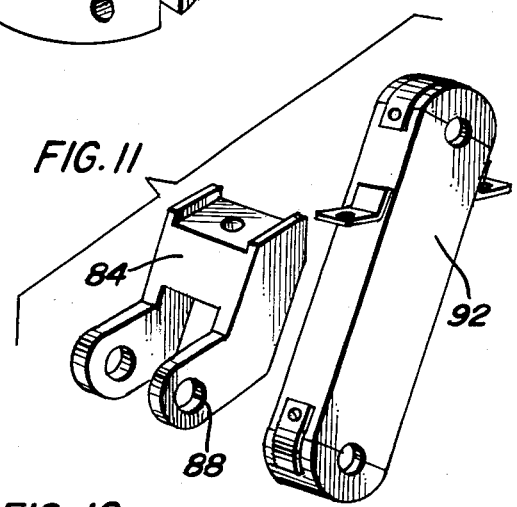
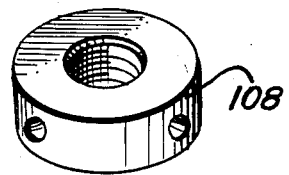
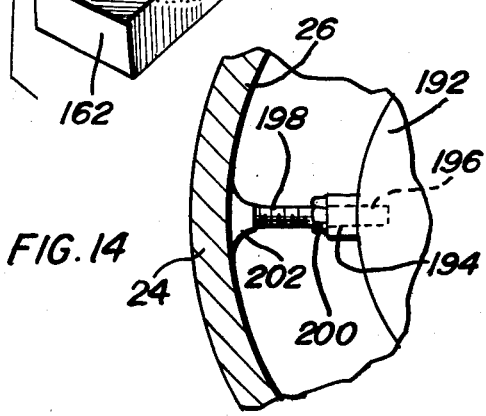
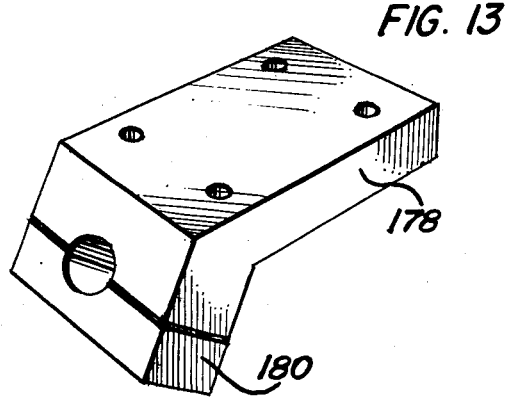

SEMI-AUTOMATIC VALVE TOOL

BACKGROUND OF THE INVENTION

1. Field of the Invention

The present invention generally relates to a tool for semi-automatically performing various machining operations internally of a valve body and more specifically various machining operations associated with a valve seat, valve seat ring, the welds which may hold the valve seat ring in place, the valve seat ring step on the valve body and the interior of the valve body with the tool including both hand feeds and a drive motor to adjustably support and drive a tool adapter which may support various types of cutting tools depending upon the machining operation to be performed.

2. Information Disclosure Statement

Various tools exist for adjustably supporting and driving tools while performing various machining operations and included in such tools are those adapted to perform machining operations interiorly of cylindrical structures such as valve bodies and the like. The following U.S. patents disclose related devices.

| | |
|---|---|
| 584,422 | 6/15/1897 |
| 2,283,323 | 5/19/1942 |
| 3,348,437 | 10/24/1967 |
| 4,161,127 | 7/17/1979 |
| 4,175,471 | 11/27/1979 |

SUMMARY OF THE INVENTION

An object of the present invention is to provide a valve tool which is semi-automatic in operation and capable of adjustably supporting and movably supporting various tools for performing various machining operations internally of a valve body.

Another object of the invention is to provide a valve body machining tool having hand feed and a drive motor together with support structure for accurately and adjustably supporting a tool adapter in adjusted position in relation to a surface to be machined with the drive motor moving the tool and tool adapter in a circular path having a center of rotation coinciding with the longitudinal center line of the valve body.

A further object of the invention is to provide a valve tool in accordance with the preceeding objects in which the tool includes a main drive tube centrally supported in the valve body by a top plate secured to the open end of the valve body and a supporting spider at the inner end of the main drive tube with bearing assemblies supporting the main drive tube from the support plate and spider and a drive motor supported on the support plate drivingly engages the main drive tube to rotate it in relation to the support plate and spider with the inner end of the main drive tube supporting a tool adapter plate with a compound tool slide and tool adapter mounted thereon by which various machining tools may be adjustably supported and rotated in a path having a predetermined relationship to the rotational axis of the main drive tube which is concentric with the interior of the valve body, valve seat and the like.

Still another object of the invention is to provide a valve tool in accordance with the preceeding objects which includes a hand wheel for adjusting the compound tool slide and a hand wheel for adjusting the vertical position of the tool adapter plate, compound tool slide and tool adapter with the main drive tube including a longitudinally extending rack gear thereon and the support plate including a lockable gear in meshing engagement with the rack gear to provide a rough vertical setting for the main drive tube.

A still further object of the invention is to provide a valve tool in accordance with the preceeding objects which is relatively simple in construction, easy to install, adjust and use and adapted for performing various machining operations internally of a valve body.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 8 is an exploded group perspective view of the main drive tube, tool plate and guard structure.

FIG. 9 is a perspective view of the lead screw assembly which is positioned in the main drive tube.

FIG. 10 is a perspective view of a top bushing assembly.

FIG. 11 is a group perspective view of a worm gear bracket and guard structure.

FIG. 12 is a perspective view of lock-nut structure.

FIG. 13 is a perspective view of the tool mounting adapter.

FIG. 14 is a fragmental view of an alternative adjustable spider.

DESCRIPTION OF THE PREFERRED EMBODIMENT

Figure 1:
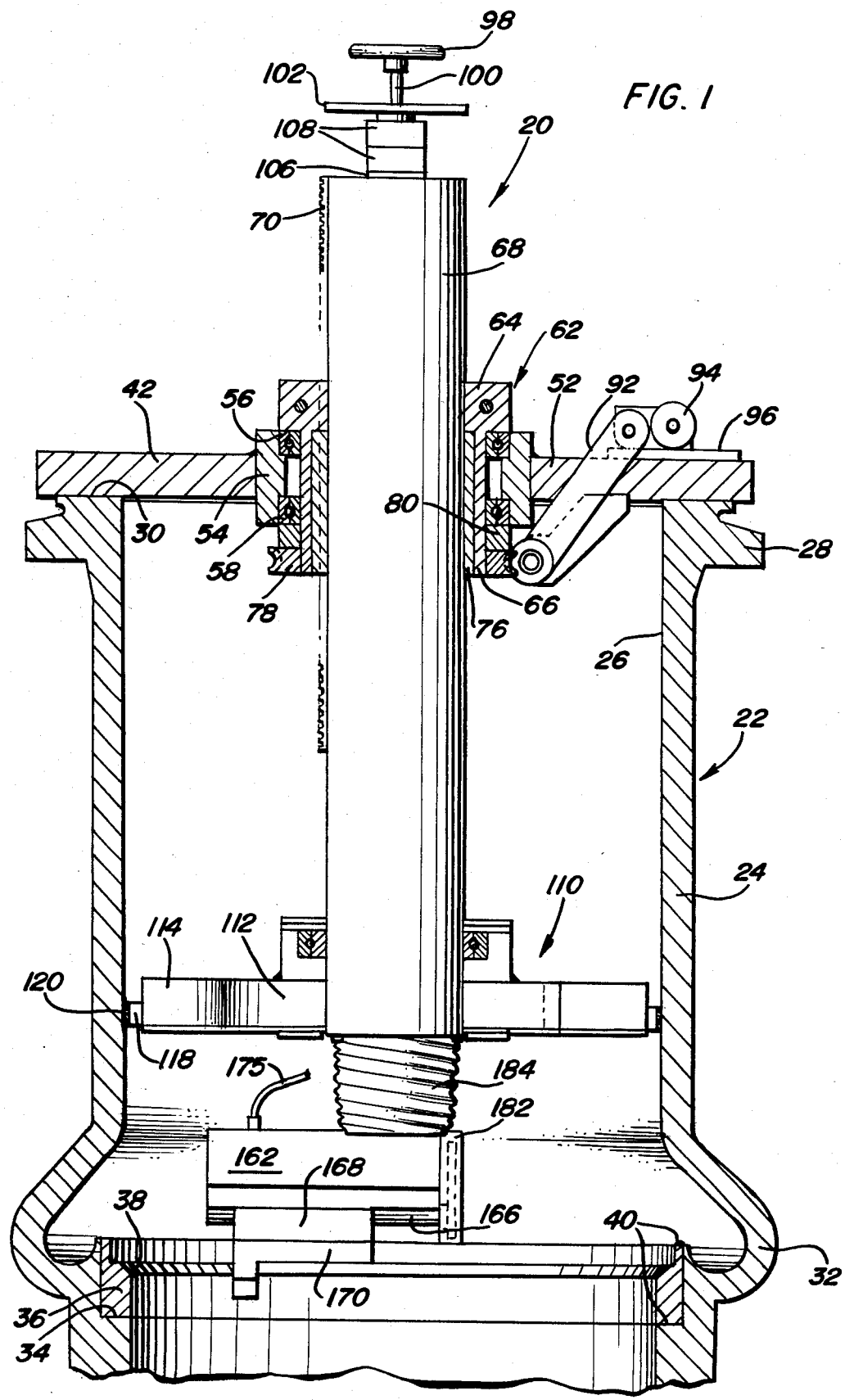
FIG. 1 is a side elevational view of the valve tool of the present invention with portions of the tool and the valve body being illustrated in section.

Referring now specifically to the drawings, the valve tool of the present invention is generally designated by numeral 20 and is illustrated in assembled relation to a valve body generally disignated by numeral 22 in which the valve body includes cylindrical wall 24 having an internal surface 26 of cylindrical configuration and which includes internal structural features which are conventional in various types of valves such as a main steam isolation valve. The exterior of the valve body is provided with a flange or lugs 28 projecting radially therefrom which normally supports and retains the top plate of the valve through which the valve stem extends and which is removed to enable the valve tool 20 to be inserted into the valve body and supported from the upper or outer end thereof which is provided with a flat surface 30. At the opposite end of the valve body 22, the wall 24 is provided with an outwardly projecting portion 32 which curves inwardly and has a valve seat ring step 34 formed therein for receiving a valve seat ring 36 having a valve seat 38 formed therein with the valve seat ring 36 being secured to the seat ring step 34 by conventional means such as welding at 40. This structure of the valve body and valve seat ring is conventional in and of itself with the valve tool 20 adapted to perform various machining operations internally of the valve body 22.

Figures 2, 3:
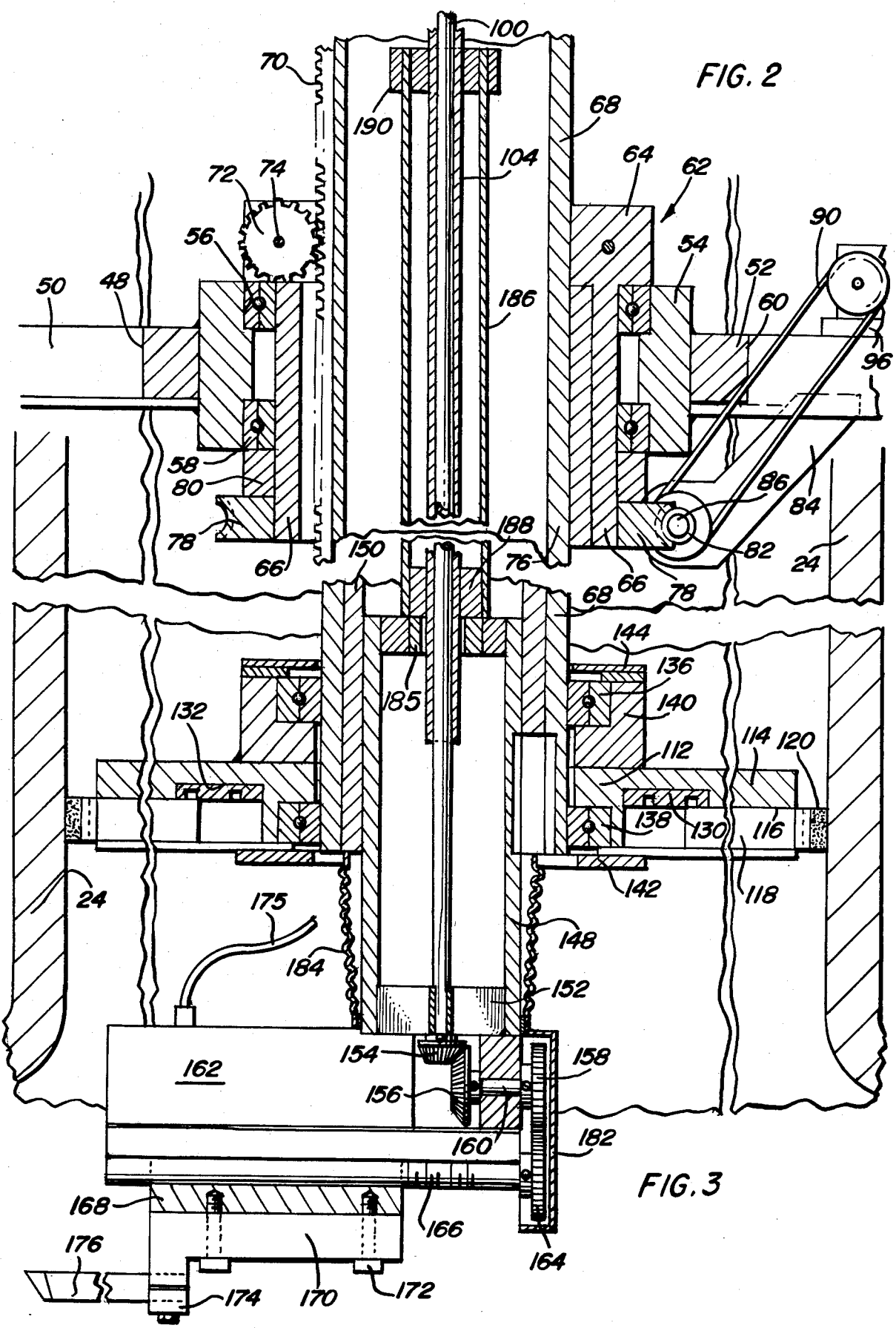
FIG. 2 is a fragmental sectional view, on an enlarged scale, illustrating the portion of the valve tool supported by the support plate.
FIG. 3 is a fragmental sectional view, on an enlarged scale, illustrating the structure of the tool supported by the spider and the tool adapter plate, compound tool slide and tool adapter.
Figure 4:
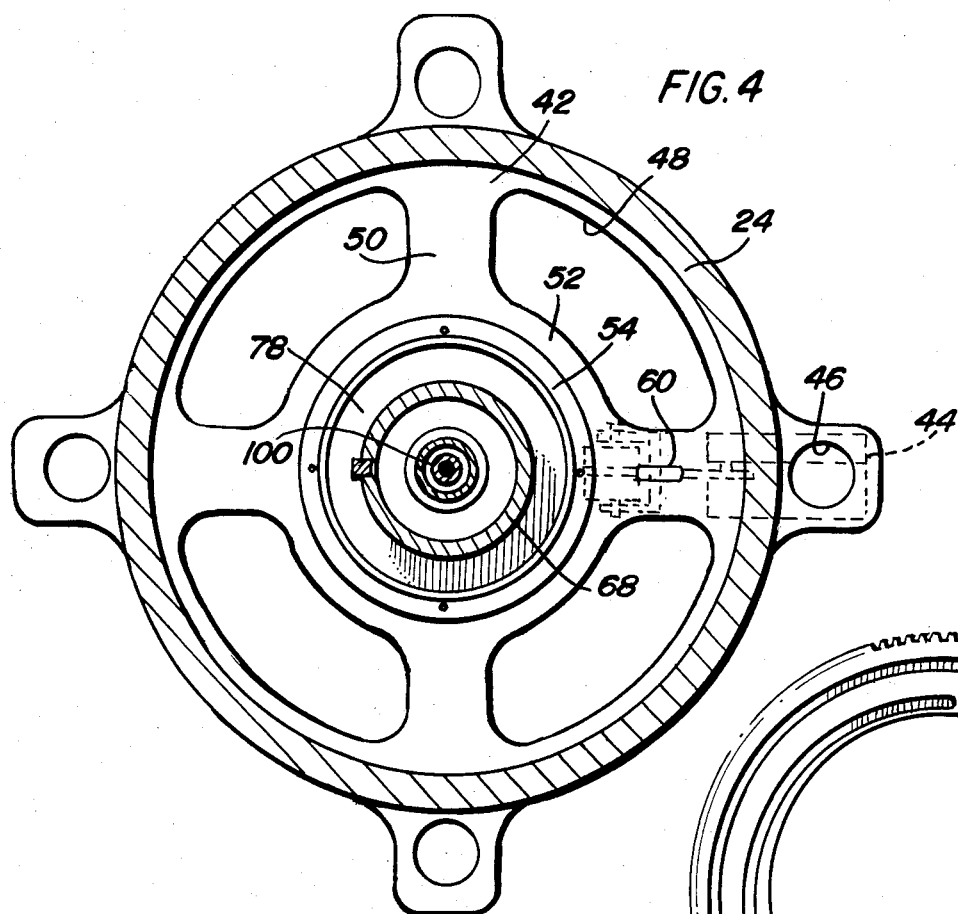
FIG. 4 is a sectional view illustrating the structure of the support plate.

The valve tool 20 includes a top plate or support plate 42 which is supported against the surface 30 on the valve body 22 with the plate 42 including lugs 44 with apertures 46 therein which enables the top plate 42 to be rigidly affixed but detachably connected with the lugs 28 on the valve body 22. The top plate 42 is of circular configuration and provided with openings 48 of arcuate configuration to provide supporing webs 50 and a center supporting structure 52 having a generally cylindrical sleeve structure 54 rigidly affixed thereto with the interior of the sleeve including suporting steps 56 for bearing assemblies 58 oriented at both the top and bottom interior corners of the sleeve 54. One of the supporting webs 50 is provided with a slot 60 extending therethrough for a purpose described hereinafter. Supported interiorly of the bearings 58 is a top bushing assembly 62 which includes an upper flange 64 provided with a depending cylindrical body 66 which is received in and rotatably supported by the bearings 58 as illustrated in FIG. 2.

Vertically slidably mounted in the bushing assembly 62 is a main drive tube 68 which is cylindrical and tubular in construction with one side of the main drive tube including a longitudinally elongated rack gear 70 formed thereon or mounted thereon in a conventional manner with the rack gear preferably being received in a longitudinal groove in the tube 68 which is provided with a closure plate at its upper end. The flange 64 on the bushing assembly 62 includes a pinion gear 72 which meshes with the rack gear 70 with the gear 72 being journalled on a shaft 74 and positioned in a recess in the flange 64. A bushing 76 is interposed between the tube 68 and the cylindrical portion 66 of the bushing 62 with the lower end of the cylindrical portion 66 of the bushing 62 having a worm gear 78 rigidly mounted thereon with a spacer ring 80 being positioned between the lower bearing 58 and the worm gear 78. The bushing 76 and flange 64 have a longitudinal groove or recess formed therein receiving the rack gear 70 which guides and positions the tube 68 in relation to the support plate 42.

A worm drive gear or pinion gear 82 is journalled from a support bracket 84 rigidly affixed to the under surface of the top plate 42 and the gear 82 is supported on a jack shaft 86 which extends through apertures 88 on projecting lugs on the bracket 84 which is secured to the web 50 having the slot 60 therethrough by a fastening device with the jack shaft 86 being driven by a chain drive 90 extending through slot 60 which is provided with a guard 92 with the chain being driven from a drive motor 94 suported on a plate 96 and drivingly connected to the chain 90 through a reduction gear unit whereby activation of the motor 94 will cause rotation of the jack shaft 86 and the drive worm gear 82 and the worm gear 78 that is rigidly affixed to the bushing 62 in order to rotate the bushing 62 and thus the main drive tube 68 about the longitudinal axis of the main drive tube 68 with the bearings 58 providing support for the main drive tube 68.

Mounted at the upper end of the main drive tube 68 is a compound feed hand wheel 98 having a compound feed drive shaft 100 attached thereto and extending centrally into the main drive tube 68. Also, mounted at the upper end of the tube 68 and below the hand wheel 98 is a vertical feed hand wheel 102 having a lead screw 104 attached thereto with a lock washer 106 and lock nuts 108 being provided on the lead screw 104 under the hand wheel 102.

At the lower end of the main drive tube 68, a supporting and stabilizing spider 110 is provided to centralize the main drive tube 68 and secure the lower end thereof in concentric relation to the valve body wall 24. The spider 110 includes a circular body 112 with three arms 114 radiating therefrom with each of the arms 114 including a longitudinal recess 116 in the under surface thereof for radially slidably supporting a spider jaw 118. Each spider jaw 118 includes a brass insert 120 at the outer end thereof secured in place by a retaining screw 122 which may be counter-sunk into the insert 120. The inner end of the spider jaw 118 is provided with an upstanding flange 124 and both surfaces of the flange 124 and the inner end surface of the jaw 118 are arcuately curved as at 126 with the arc of curvature corresponding to the curved surfaces of a spiral groove 128 formed in scroll 130 in the form of an annular member received in a recess 132 in the bottom of the body 112 of the spider 110 with the recess 132 communicating with the radial recess 116 with grooves 128 receiving the flanges 124 therein so that by rotation of the scroll 130 by rotating pinion gear assembly 131 which is in meshing engagement with gear 134, the jaws 118 can be radially extended and retracted.

Figure 5:
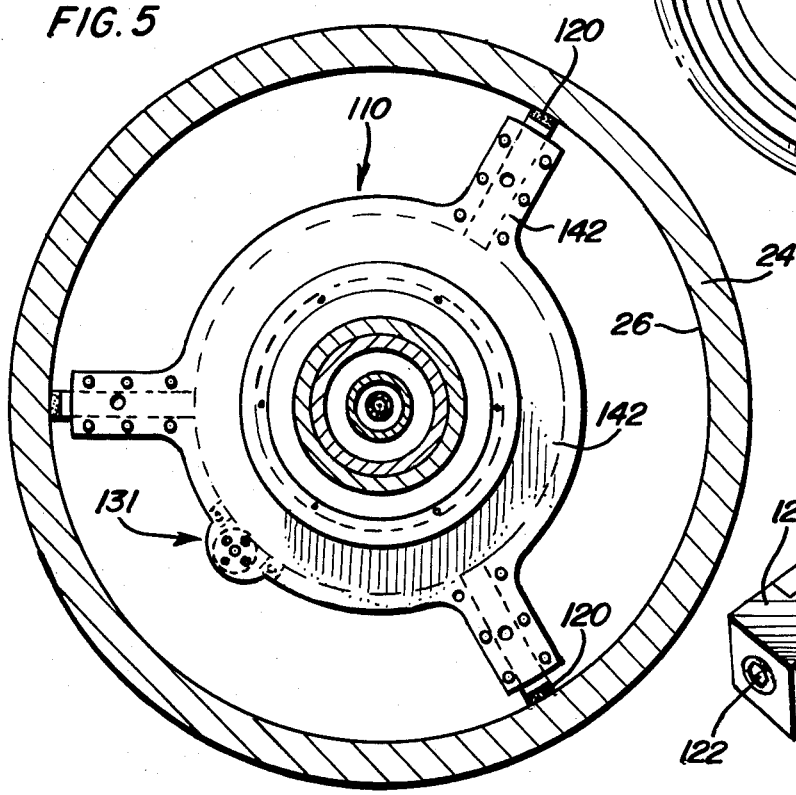
FIG. 5 is a sectional view illustrating the structure of the support spider.

In order to rotate the scroll 130, it is provided with gear teeth 134 on the periphery thereof with the scroll groove 128 extending one and one-half turns from its starting point to its terminal point with the radial movement of the jaws 118 being equalized for movement of the bronze inserts 120 into engagement with the internal surface 26 on the wall 24 as illustrated in FIG. 5. The outer end of the inserts 120 may be machined to generally conform with the internal curvature of the internal surface 26 on the wall 24.

The lower end of the drive tube 68 extends through the spider 110 and is journalled therefrom by bearings 136 and 138 with the bearing 136 being received in a bushing 140 and the bearing 138 received in a recess in the spider body 112. The lower end of the spider is closed by a cover plate 142 and the bearings 136 and 138 are retained in place by the bottom cover plate 142 and a top retaining ring 144. Positioned in the lower end of the tube 68 is an elongated quill in the form a tubular member 148 supported by a support bushing 150 which is received in the tube 68 and terminates at the lower end thereof with the quill 148 extending below the lower end of the tube 68 and provided with a support spider 152 at the lower end thereof which rotatably journals the compound feed shaft 100 which has a spur gear 154 on the lower end thereof as illustrated in FIG. 3. The spur gear 154 is a beveled gear and is in meshing engagement with a similar beveled spur gear 156 which drives a gear 158 supported by a shaft 160 journalled in an adapter plate 162. The gear 158 is in meshing engagement with gear 164 driving a compound tool slide shaft 166 for adjusting compound tool slide 168 having a tool adapter 170 secured thereto by fasteners 172. The tool adapter includes a supporting clamp structure 174 for supporting a tool 176. One type of tool adapter 170 is illustrated in FIG. 3 and another type of tool adapter 178 is illustrated in FIG. 13 in which the tool holder clamp structure 180 is at an obtuse angle rather than perpendicular to the tool adapter. The gears 158 and 164 are provided with a guard 182 secured in overlying relation thereto and a bellows 184 extends between the adapter plate 162 and the lower end of the quill bushing 150 to protect the external surface of the quill 148 as illustrated in FIG. 3.

Various tools may be supported by the tool adapter 170 or 178 such as carbide burrs, milling cutters, grinding wheels and the like which may be air driven and supplied with air through air supply tube 175 having suitable control valve therein and a similar air drive may be used to operate the pinion gear 131. Rotation of the compound feed hand wheel 98 is transferred through the shaft 100, gears 154 and 156, shaft 160 and gears 158 and 164 to the compound slide feed shaft 166 to accurately position the slide 168 and the tool adapter 170 and tool 176 supported therefrom with the tool adapter being interchangeable and the tool being changeable. Rotation of the tool 176 is accomplished by the motor 94 rotating the main drive tube 68 through the chain drive 90, the worm gear 82 and the worm wheel or gear 78 which rotates the tube 68 and all of the components mounted thereon including the adapter plate, slide feed, slide and tool adapter and tool with the speed of movement being any desired speed depending upon the machining operation to be performed. The hand wheel 98 provides an accurate radial adjustment of the tool 176 and the vertical feed hand wheel 102 provides an accurate axial adjustment and positioning of the tool 176 in a manner described hereinafter. By using various tools and tool adapters, various machining operations and capabilities may be obtained including removal of the valve seat ring 38 by machining away the welds 40 that retain the seat ring in the valve body. Also, the seat ring step 34 may be machined if required and weld preparation inside of the valve body may be machined to accomodate the welding of the replacement valve seat ring. Also, the new valve seat 38 may be machined after welding in order to be concentric with the inside diameter of the valve body and the seat area may be lapped to a microfinish and the interal ribs of the valve body may be machined if required. The lead screw 104 has a passage way which receives the shaft 100 and has its upper end connected with the vertical feed hand wheel 102 and its lower end in screw-threaded engagement with a lead screw nut tube 185 which is press-fitted into the quill 148. A locking lead screw 186 is disposed concentrically of the lead screw 104 and includes a locking nut 188 press-fitted into the locking lead screw tube 186 and threadedly engaged with the lower end of the lead screw 104 as illustrated in FIG. 2. The nut 188, in addition to being press-fitted into the locking lead screw tube 186, is also pinned by suitable radial pins and the like. The upper end of the locking lead screw tube 186 is provided with a collar 190 that is welded in place and provided with equally spaced radial holes.

Figure 6:
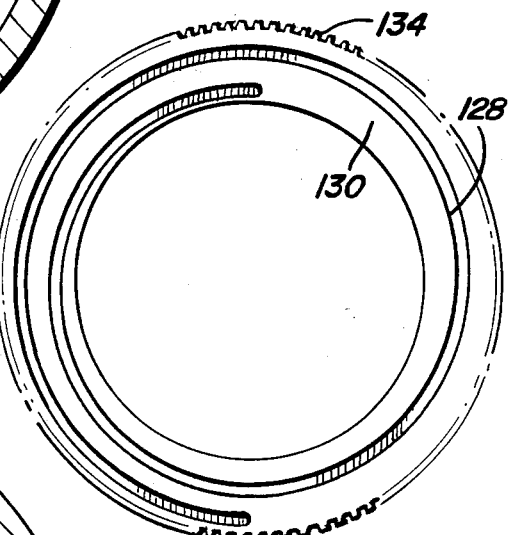
FIG. 6 is a detailed elevational view of the spider structure for radially adjusting the spider jaws.
Figure 7:
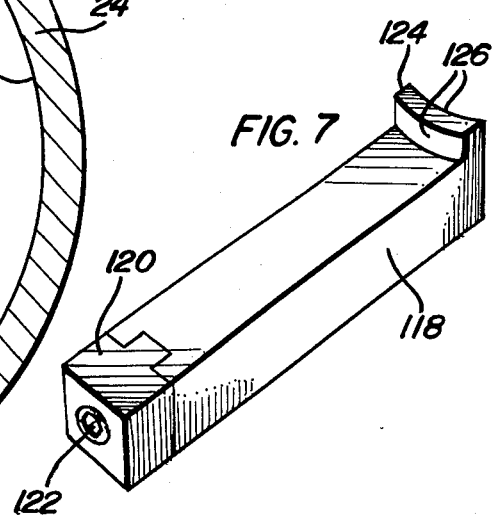
FIG. 7 is a perspective view of one of the spider jaws.

As an alternative to the universal type spider 110 as shown in FIGS. 5-7, an independently adjustable spider 192 can be used as shown in FIG. 14 in which each arm 194 is provided with a threaded socket 196 extending inwardly for receiving an externally threaded member 198 which is adjusted by rotation into engagement with the valve body wall 24. A lock nut 200 is threaded onto the member 198 to lock it in adjusted position to position the main drive tube in accurate concentric relation to the valve body wall 24 and seat ring 36. The outer end of each threaded centering member 198 has an outwardly flared end 202 engaging the inner surface 26 of the valve body wall 24.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for performing work operations on interior surface areas of an open-ended tubular work piece comprising a support plate adapted to be mounted on the open end of the work piece, an elongated tubular member supported centrally of the support plate and extending through the support plate, means supporting the tubular member from the plate for axial movment of the tubular member, means interconnecting the support plate and tubular member for rotating the tubular member about its longitudinal axis in substantially perpendicular relation to the support plate, a support spider rotatably mounted on the end of the tubular member inserted into the tubular work piece with the support spider including a plurality of radial supporting arms, a radially moveably supported centering member on each spider arm with the outer ends of the centering members engaging the interior surface areas of the work piece to stabilize and support the inner end of the tubular member and centering the tubular member in relation to the work piece, a tool adapter, slide and slide feed vertically movably supported from the inner end of the tubular member with the tool adapter including means to support a tool to perform a work operation, means operable from the end of the tubular member remote from the tool adapter to actuate the tool slide feed to move the tool adapter and tool supported thereon laterally of the work piece to engage the tool with an interior surface area of the work piece for performing a work operation when the tubular member is rotated, and means at the end of the tubular member remote from the tool adapter to provide a fine axial adjustment of the tool adapter to adjust the tool axially of the interior surface areas of the work piece.

2. The apparatus as defined in claim 1 wherein said tubular member is of cylindrical configuration, said means supporting the tubular member for axial movement through the support plate including a support bushing rotatably journalled through the support plate and receiving the exterior of the tubular member, an elongated rack gear on the outer surface of the tubular member, said bushing including an axial groove receiving the rack gear to prevent relative rotation between the tubular member and bushing, a pinion gear rotatably mounted on the bushing and meshing with the rack gear for moving the tubular member axially in relation to the bushing to provide a rough axial adjustment of the tool adapter and tool mounted thereon.

3. The apparatus as defined in claim 2 wherein said means for rotating the tubular member includes a driven worm gear fixedly attached to the bushing, a drive worm gear meshing with the driven worm gear, said drive worm gear being supported from the support plate, a drive motor drivingly connected to the drive worm gear for rotating the worm gears and bushing thereby rotating the tubular member.

4. The apparatus as defined in claim 1 wherein said means actuating the slide feed includes an elongated shaft journalled in the tubular member and projecting from each end thereof, a hand wheel mounted on the end of the shaft projecting from the end of the tubular memeber opposite to the tool adapter for rotating the shaft, a gear drive interconnecting the end of the shaft adjacent the tool adapter and the slide feed for rotating the slide feed, said slide feed being rotatable about an axis perpendicular to the axis of the tubular member and parallel to the slide for moving the slide laterally of the rotational axis of the tubular member.

5. The apparatus as defined in claim 1 wherein said means to provide fine axial adjustment of the tool adapter includes a lead screw mounted axially in the tubular member in concentric relation to the tabular member with the lead screw extending axially from the end of the tubular member opposite to the tool adapter and provided with a hand wheel for rotation thereof, a tubular quill axially moveably mounted in the end of the tubular member adjacent the tool adapter, a screw-threaded connection between the lead screw and quill to move the quill axially of the tubular member upon rotation of the lead screw, said slide feed, slide and tool adapter being supported from the quill and moveable axially with repect to the tubular member with the quill when the lead screw is rotated.

6. The apparatus as defined in claim 1 wherein said spider includes a recess in each arm slidably receiving a spider jaw, an annular recess in the spider in communication with the arm recesses, an anular member in the annular recess with the annular member including a spiral groove in an axial surface thereof, each spider jaw including a projection received in the spiral groove, and means rotating the annular member for moving the jaws radially in the recess and in relation to the spider arms.

7. The structure as defined in claim 1 wherein said centering members are screw threadedly mounted on said spider arms.

* * * * *